(12) United States Patent
Winfried et al.

(10) Patent No.: US 11,796,375 B2
(45) Date of Patent: Oct. 24, 2023

(54) FILL-LEVEL MEASURING DEVICE

(71) Applicant: Endress+Hauser SE+Co. KG, Maulburg (DE)

(72) Inventors: Mayer Winfried, Buch (DE); Klaus Feißt, Stegen (DE); Qi Chen, Maulburg (DE); Ralf Reimelt, Freiburg (DE); Thomas Blödt, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 270 days.

(21) Appl. No.: 17/413,758

(22) PCT Filed: Nov. 13, 2019

(86) PCT No.: PCT/EP2019/081204
§ 371 (c)(1),
(2) Date: Jun. 14, 2021

(87) PCT Pub. No.: WO2020/120059
PCT Pub. Date: Jun. 18, 2020

(65) Prior Publication Data
US 2022/0049984 A1 Feb. 17, 2022

(30) Foreign Application Priority Data
Dec. 14, 2018 (DE) ...................... 10 2018 132 285.2

(51) Int. Cl.
*G01F 23/284* (2006.01)
*G01S 7/02* (2006.01)
*G01S 13/88* (2006.01)

(52) U.S. Cl.
CPC ............ *G01F 23/284* (2013.01); *G01S 7/027* (2021.05); *G01S 13/88* (2013.01)

(58) Field of Classification Search
CPC ......... G01F 23/284; G01S 7/027; G01S 13/88
See application file for complete search history.

(56) References Cited

U.S. PATENT DOCUMENTS

| 5,495,218 A * | 2/1996 | Erb | ............................ | H01P 1/08 333/248 |
| 5,877,663 A * | 3/1999 | Palan | ...................... | H01Q 19/08 333/252 |

(Continued)

FOREIGN PATENT DOCUMENTS

| DE | 102015119690 A1 * | 5/2017 | ........... G01F 23/284 |
| DE | 102015119690 A1 | 5/2017 | |

(Continued)

*Primary Examiner* — Peter M Bythrow
(74) *Attorney, Agent, or Firm* — Kelly J. Smith; Endress+Hauser (USA) Holding, Inc.

(57) ABSTRACT

A radar-based fill-level measuring device, comprises the following parts: a semiconductor component for producing electrical high-frequency signals or for determining the fill-level value from the received high-frequency signals; a dielectric waveguide placed in contact with the semiconductor component to couple the high-frequency signals as radar signals into an antenna and/or to couple received radar signals from the antenna as electrical signals into the semiconductor component; a potting encapsulation, which encapsulates at least the waveguide radially such that a defined cavity is formed between the waveguide and the potting encapsulation.

8 Claims, 2 Drawing Sheets

(56) References Cited

U.S. PATENT DOCUMENTS

| | | | | |
|---|---|---|---|---|
| 5,955,684 A * | 9/1999 | Gravel | | H01R 13/527 73/866.5 |
| 6,062,095 A * | 5/2000 | Mulrooney | | G01D 11/24 73/204.22 |
| 6,148,681 A * | 11/2000 | Gravel | | H01R 13/527 73/866.5 |
| 6,553,830 B2 * | 4/2003 | Fahrenbach | | G01F 23/284 324/95 |
| 2003/0151560 A1 * | 8/2003 | Kienzle | | A61P 37/02 343/786 |
| 2005/0057264 A1 * | 3/2005 | Klofer | | G01S 13/88 324/644 |
| 2006/0000274 A1 * | 1/2006 | Kallsand | | G01F 23/284 73/290 V |
| 2007/0034002 A1 * | 2/2007 | Reimelt | | G01F 23/284 73/290 R |
| 2007/0164420 A1 * | 7/2007 | Chen | | H01Q 1/2283 257/691 |
| 2009/0289835 A1 * | 11/2009 | Edvardsson | | G01F 23/284 342/124 |
| 2010/0201563 A1 * | 8/2010 | Flasza | | G01F 23/284 342/124 |
| 2012/0206290 A1 * | 8/2012 | Wegemann | | G01F 23/284 342/124 |
| 2013/0099989 A1 * | 4/2013 | Pantea | | H01Q 13/0208 343/783 |
| 2014/0084944 A1 * | 3/2014 | Kienzle | | G01S 7/02 324/642 |
| 2015/0253176 A1 * | 9/2015 | Jirskog | | G01S 7/35 342/124 |
| 2015/0276459 A1 * | 10/2015 | Sai | | H01Q 15/08 73/290 V |
| 2019/0191545 A1 * | 6/2019 | Motzer | | H05K 1/115 |

FOREIGN PATENT DOCUMENTS

| | | |
|---|---|---|
| DE | 102017112894 A1 | 12/2018 |
| DE | 102017122600 A1 | 3/2019 |
| EP | 2023097 A1 | 2/2009 |
| EP | 2687830 A2 | 1/2014 |
| WO | 9301474 A1 | 1/1993 |
| WO | 03098168 A1 | 11/2003 |
| WO | 2004046663 A1 | 6/2004 |

* cited by examiner

FILL-LEVEL MEASURING DEVICE

CROSS-REFERENCE TO RELATED APPLICATIONS

The present application is related to and claims the priority benefit of German Patent Application No. 10 2018 132 285.2, filed on Dec. 14, 2018 and International Patent Application No. PCT/EP2019/081204, filed on Nov. 13, 2019, the entire contents of which are incorporated herein by reference.

TECHNICAL FIELD

The invention relates to a fill-level measuring device for measuring the fill level of a filler located in a container.

BACKGROUND

In process automation technology, field devices for capturing or modifying process variables are generally used. For this purpose, the functioning of the field devices is in each case based on suitable measuring principles in order to capture the corresponding process variables, such as fill level, flow rate, pressure, temperature, pH value, redox potential, or conductivity. A wide variety of such field devices is manufactured and distributed by the Endress+Hauser company.

For measuring the fill level of filling materials in containers, radar-based measuring methods have become established since they are robust and require minimum maintenance. Within the scope of the invention, the term "containers" also refers to containers that are not closed, such as basins, lakes, or flowing bodies of water. A key advantage of radar-based measuring methods lies in their ability to measure the fill level quasi-continuously. In the context of this patent application, the term "radar" refers to microwave signals having frequencies between 0.03 GHz and 300 GHz.

In the case of radar-based filling-level measurement, the pulse time-of-flight principle is an established measuring principle. Here, pulse-shaped microwave signals are emitted cyclically in the direction of the filler and the time of flight until reception of the corresponding pulse-shaped receive signal is measured. On the basis of this measuring principle, filling-level measuring devices can be realized with comparatively low circuitry complexity. If a more complex circuit technology can be accepted, FMCW (frequency-modulated continuous wave) is a possible measuring principle for radar-based filling-level measurement. The operating principle of fill-level measuring devices based on FMCW and pulse radar is described, for example, in "Radar Level Measurement;" Peter Devine, 2000.

In the field of fill-level measurement, the measurement is predominantly performed at radar frequencies of 6 GHz, 26 GHz or 79 GHz. In general, the higher the frequency band that is selected, the narrower the beam cone of the radar signal. Moreover, at least in the case of FMCW, higher frequency bands are preferred to the extent that a greater absolute frequency bandwidth can be used. At 79 GHz, for example, a bandwidth of 4 GHz is used, that is to say from 76 GHz to 80 GHz. With a greater bandwidth, a higher resolution of distance measurement can in turn be achieved. Especially in the case of fill-level measurement, this represents an important requirement since, depending on the application, as accurate a knowledge as possible of the fill level is required. A further advantage of using high frequencies is that the radar-based distance measuring device can be equipped with a more compact antenna without reducing the bundling effect of the antenna. In the fill-level measurement, for example, this makes it possible to have downsized connection flanges for attachment to the container. It is therefore desirable to also operate fill-level or distance measurement generally at frequencies higher than 79 GHz (up to radar frequencies of 300 GHz).

At frequencies above 100 GHz, the high-frequency electrical signal by means of which the radar signal is generated can no longer be guided via hybrid connection technologies between the semiconductor component with which the corresponding high-frequency electrical signal is generated and the printed circuit board on which the semiconductor component is placed. Since the dimensions of the connection structures, such as bond wires or soldering points, to the respective electronic components are within the order of magnitude of the wavelength of the radar signals, these connection structures disturb the transmission behavior as parasitic elements. In addition, many of the materials customary in electronics cause losses that increase with frequency, due to which the electrical high-frequency signals are significantly attenuated even over short line distances. This is why a high-performance and reliable contacting of the semiconductor component by means of standard hybrid technologies is difficult with increasing frequency. For this reason, for the generation or reception of radar signals above, especially, 100 GHz, semiconductor components are used from which the electrical high-frequency signal can be coupled out directly as a radar signal, or with which incoming radar signals can be converted directly into corresponding electrical high-frequency signals. Hybrid signal routing is thus no longer required. In this case, the radar signals are coupled out or in by means of a corresponding primary emitter. This is, for example, a planar antenna, which is attached to the semiconductor component by means of micromechanical methods. Such a semiconductor component is inter alia described in publication DE 10 2015 119 690 A1. This thus prevents the electrical high-frequency signals from having to be routed through external printed circuit boards, soldered connections or bond wires. This reduces the performance and susceptibility to interference of the distance measuring device precisely at high frequencies.

Another advantage of a monolithic construction is that both signal generation and signal evaluation can be implemented in the same semiconductor component, so that the fill-level measuring device can have a more compact overall design. Known circuit components can be implemented in the semiconductor component in order to create the signal generation unit or the signal evaluation unit, depending on the measurement method: In the case of FMCW, the high-frequency signal for the radar signal that is to be emitted can be generated by means of a PLL (phase-locked loop); the received radar signal can be mixed by a mixer with the high-frequency signal that is to be emitted so that the distance or fill level can be determined from the so-called difference frequency of the mixed signal. A correspondingly designed evaluation block can, for example, determine the difference frequency by means of an FFT (fast Fourier transform) of the mixed signal.

However, the direct emission of the radar signal from the semiconductor component is not possible, at least in the case of fill-level measurement, because the radiation from the primary radiator is largely undirected. It is obvious that the radiation is concentrated via a dielectric lens. However, such a lens can be sufficiently illuminated only if either the primary radiator has a sufficient beam concentration or the lens is placed directly on the semiconductor component. However, a strongly concentrating primary radiator has the disadvantage that a correspondingly sized chip surface has to be reserved on the semiconductor component for this purpose. A lens mounted directly on the primary radiator in turn has the disadvantage that the semiconductor component is thereby also indirectly exposed to the filler or the environment with respect to mechanical and thermal loading. A protective encapsulation, for example in the form of a pressure-resistant window, can be implemented close to the semiconductor component only with great difficulty.

SUMMARY

The object of the invention is therefore to provide a radar-based fill-level measuring device, which is designed for high radar frequencies and can be used under harsh ambient conditions.

The invention achieves this object by a radar-based fill-level measuring device, which comprises at least the following:
- a semiconductor component configured,
    - to generate high-frequency electrical signals, preferably having a frequency of at least 100 GHz, and/or to receive corresponding high-frequency signals, and
    - to determine a fill level value on the basis of at least the received high-frequency signals,
- a dielectric waveguide that is preferably made of an insulating material with a dielectric value of more than 1 (especially HDPE or PTFE), wherein the waveguide is in contact with the semiconductor component in such a way that the high-frequency signals are coupled as radar signals into
- an antenna, and/or in such a way that received radar signals from the antenna are coupled into the semiconductor component as electrical signals,
- a potting encapsulation radially encapsulating at least the waveguide in such a way that a defined cavity is formed between the waveguide and the potting encapsulation.

It is advantageous for the fill-level measuring device according to the invention that the hermetic and pressure-resistant encapsulation can be implemented spaced far apart from the sensitive semiconductor component toward the filling material, especially by the partial guidance of the radar signal in the waveguide. This simplifies the manufacturability of the fill-level measuring device. On the other hand, the fill-level measuring device according to the invention offers the advantage that an efficient coupling of the radar signals in and out is made possible especially by the potting encapsulation spaced apart from the waveguide, without the protection of the semiconductor component from thermal loading being reduced. Therefore, the fill-level measuring device can for one thing be operated energy-efficiently. On the other hand, by implementing the semiconductor component, the fill-level measuring device can be designed compactly without the concentrating effect of the antenna being reduced. The fill-level measuring device can be flexibly designed depending on the field of application.

For example, for high-temperature applications, the waveguide can be dimensioned with a length of at least 3 cm, especially more than 8 cm, in order to thermally decouple the semiconductor component and any further electronics from the antenna. The coupling of the radar signals in and out can be further optimized if the potting encapsulation is designed such that the cavity between the waveguide and the potting encapsulation has a distance of at least twice the wavelength of the radar signals.

If the semiconductor component is arranged on a printed circuit board, the waveguide can be fixed to the Hall-effect conductor component by attaching an electromagnetic shielding of the semiconductor component to the printed circuit board inside the potting encapsulation. In this case, the shielding fixes the waveguide toward the semiconductor component in such a way that the radar signals can be coupled in a loss-minimized manner into the waveguide or into the semiconductor component. The shielding of the semiconductor component and the fixing of the waveguide are thus effected by the same component. If the semiconductor component is arranged on a printed circuit board, the potting encapsulation can additionally be designed such that the surface of the printed circuit board facing away from the semiconductor component is additionally encapsulated. Thus, any electronic components that are arranged on the back side of the printed circuit board are also covered by the potting encapsulation.

When the fill-level measuring device is designed with the shielding described above, the manufacturability of the fill-level measuring device can be simplified by designing the waveguide in two parts, such that the waveguide is subdivided into a first segment and a second segment in the region of the shielding.

A possible housing of the fill-level measuring device can be designed in such a way that at least the semiconductor component, the waveguide and the potting encapsulation are enclosed by the housing, wherein the antenna has to be fastened outside the housing. Accordingly, a grommet can be provided in the housing for coupling the radar signals out and in between the housing interior and exterior. Such a grommet can preferably be designed in such a way that the waveguide is fixed to the antenna such that the radar signals are coupled into the antenna or into the waveguide in a loss-free manner. For simplified production of the fill-level measuring device, the grommet can also be designed to be self-centering with respect to the waveguide.

BRIEF DESCRIPTION OF THE DRAWINGS

The invention is explained in more detail with reference to the following figures. The following is shown.

DETAILED DESCRIPTION

Figure 1:
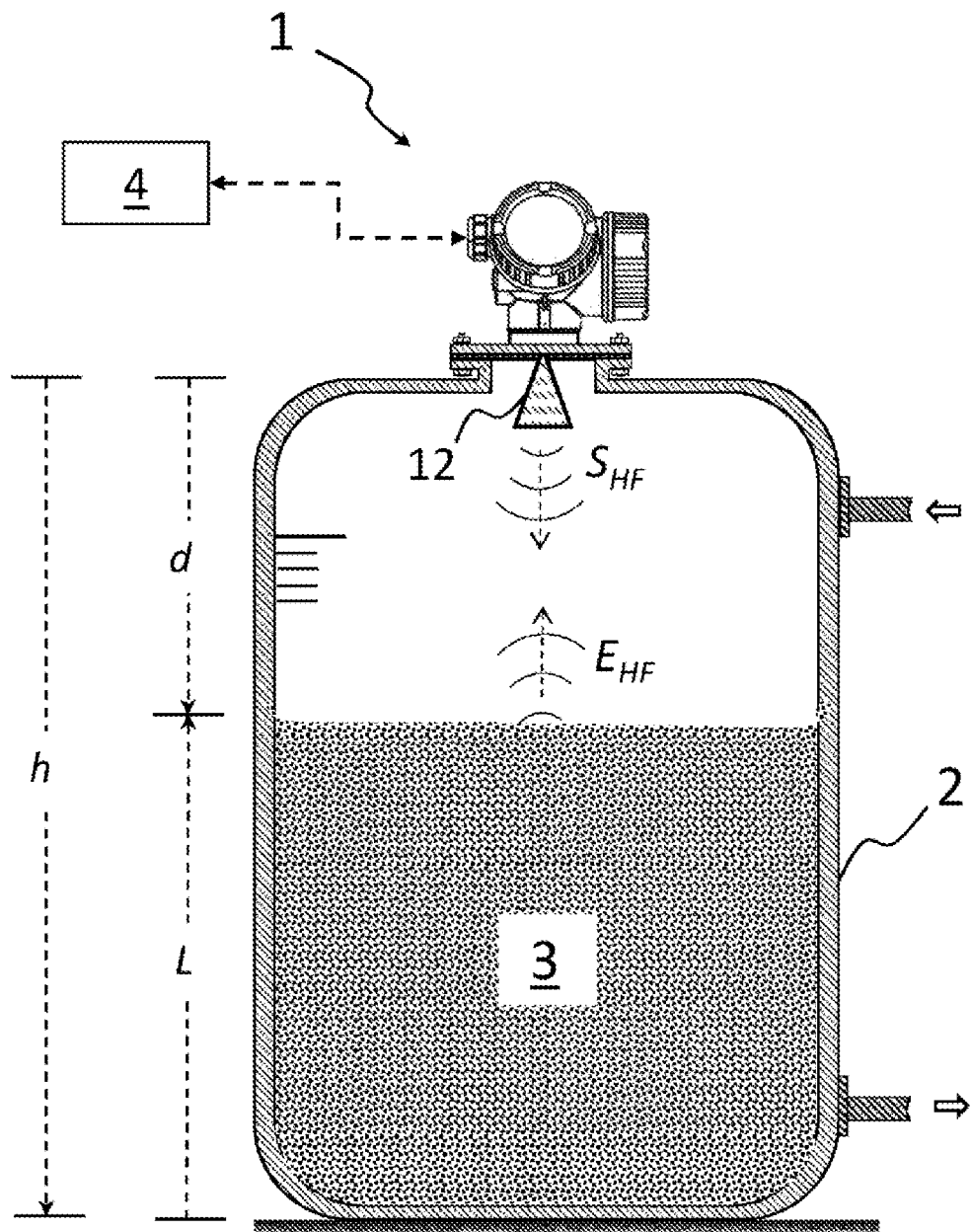
FIG. 1 shows a typical arrangement of a radar-based fill-level measuring device on a container.

For a basic understanding of the invention, FIG. 1 shows a typical arrangement of a radar-based fill-level measuring device 1 on a container 2. In the container 2 is a filling material 3, whose fill level L is to be determined by the fill-level measuring device 1. For this purpose, the fill-level measuring device 1 is mounted on the container 2 above the maximum permissible fill level L. Depending on the field of application, the installation height h of the filling-level measuring device 1 above the container bottom can be more than 100 m.

As a rule, the fill-level measuring device 1 is connected via a bus system, such as "Ethernet," "PROFIBUS," "HART," or "Wireless HART," to a higher-level unit 4, such as a process control system or a decentralized database. On the one hand, information about the operating status of the fill-level measuring device 1 can thus be communicated. On the other hand, information about the fill level L can also be transmitted via the bus system in order to control any inflows or outflows that may be present at the container 2.

Given that the fill-level measuring device 1 shown in FIG. 1 is designed as freely radiating device, it comprises a corresponding antenna 12. As indicated, the antenna 12 is designed as a horn antenna especially in the case of radar frequencies below 60 GHz. The antenna 12 here is oriented in such a way that radar signals $S_{HF}$ are emitted in the direction of the filling material 3.

The radar signals $S_{HF}$ are reflected at the surface of the filler 3 and, after a corresponding signal time-of-flight, are received as reflective radar signals $E_{HF}$ by the antenna 12 of the fill-level measuring device 1. Given that the signal propagation time depends on the distance d=h−L of the fill-level measuring device 1 relative to the filler surface, the fill level can be determined on the basis of the signal propagation time.

The aperture angle of the beam cone, below which the radar signals $S_{HF}$ are emitted or below which the reflected radar signals $E_{HF}$ are received, depends not only on the dimensioning of the horn antenna 12 but also on the frequency of the radar signals $S_{HF}$, $E_{HF}$. The higher the frequency, the narrower the aperture angle. A narrow aperture angle reduces the risk of generating interfering reflections inside the container, which could erroneously be interpreted as a fill level echo. The potentially achievable resolution of the fill level depends on the frequency, at least if the fill-level measuring device is operating by means of the FMCW method. Here as well, the higher the frequency, the higher the potentially achievable resolution of the fill level value.

Figure 2:
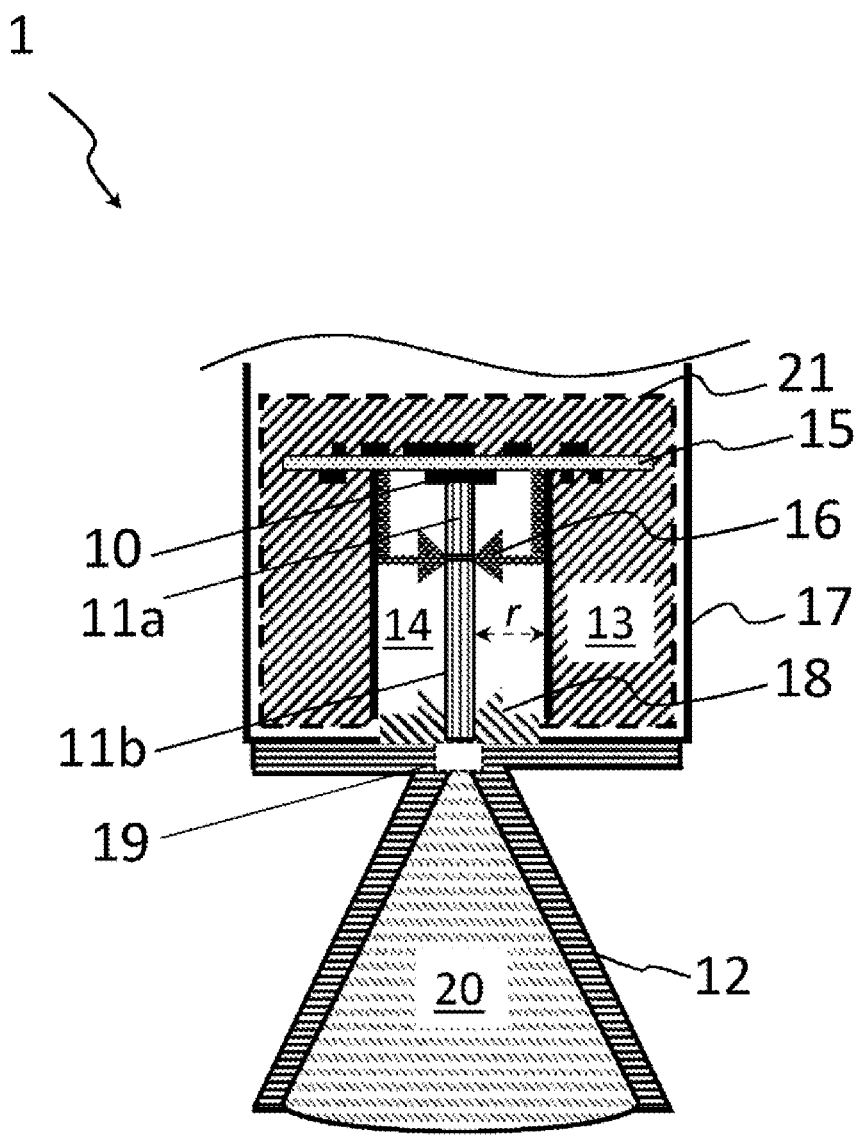
FIG. 2 shows a cross-sectional view of the fill-level measuring device according to the present disclosure.

A schematic construction of the fill-level measuring device according to the invention, which can operate at radar frequencies of more than 100 GHz and utilizes the advantages associated therewith, is shown in FIG. 2:

The core of the fill-level measuring device 1 according to the invention is a semiconductor component 10 that, depending on the measurement principle implemented (FMCW or pulse propagation principle), can generate or process corresponding high-frequency signals $s_{HF}$, $e_{HF}$ with frequencies up to 160 GHz or more. In implementing the FMCW principle, the high-frequency signal $s_{HF}$ that is to be emitted is generated, for example, by means of an oscillator (e.g., taking the form of a "voltage-controlled oscillator"), which is controlled by PLL ("phase-locked loop"). For signal processing, the semiconductor component 10 can on the receiving side comprise a mixer for mixing the high-frequency signal $s_{HF}$ that is currently to be emitted with the currently received high-frequency signal $e_{HF}$. This is used in order to be able to determine the distance d from the filler 3 or the fill level L from the mixed signal in a corresponding circuit block of the semiconductor component 10, e.g., by means of an FFT ("fast Fourier transform"), by means of the frequency of the mixed signal.

In the design variant shown in FIG. 2 of the high-frequency component 1 according to the invention, the semiconductor component 10 is arranged on a printed circuit board 15. The semiconductor component 10 and also any data transfer to the higher-level unit 4 are supplied via the printed circuit board 15. Given that the generation and processing of the high-frequency signals $s_{HF}$, $e_{HF}$ takes place completely on the semiconductor component 10, high-frequency signals do not have to be conducted to the printed circuit board 15. This eliminates loss-making hybrid connecting lines.

The high-frequency signals $s_{HF}$ are coupled from the semiconductor component 10, for example via a primary emitter (not explicitly illustrated in FIG. 2), as radar signals $SS_{HF}$ into a waveguide 11a, b. Analogously thereto, the radar signals $E_{HF}$ reflected in the container 2 are coupled into the semiconductor component 10 by the waveguide 11a, b. For this purpose, the primary radiator can be designed, for example, as a rectangular planar structure that is arranged on that side of the semiconductor component 10, which faces away from the printed circuit board 15. In this case, it is advantageous if the waveguide 11a, b is in direct contact with the semiconductor component 10, for example, by a corresponding bonding or a statically prevailing contact pressure.

The cross-sectional shape (for example, circular or rectangular) and the cross-sectional dimensions of the waveguide 11a, b are to be adapted to the frequency or the desired mode of the radar signal $S_{HF}$, $R_{HF}$ that is to be emitted/coupled. With a rectangular design, the two edge lengths of the rectangle can be designed, for example, such that they have an edge length ratio of 2:1. In this case, the first edge length can in each case be dimensioned with one third of the wavelength of the high-frequency signal $S_{HF}$, $R_{HF}$; the second edge length can accordingly be designed at ⅔ of the wavelength. In order to conduct the radar signals $S_{HF}$, $E_{HF}$ within the waveguide 11a, b in a loss-free manner, the material of the waveguide must be selected accordingly with regard to the dielectric constant. Given that a dielectric constant of at least about 1.5 is advantageous for the waveguide, HDPE or PTFE are especially suitable as a material for the waveguide 11a, b.

If the semiconductor component 10 is not arranged as a "bare die" on the printed circuit board 15, the encapsulation of the semiconductor component 10 must be adapted such that a corresponding waveguiding contact is possible between the waveguide 11a, b and the primary radiator. For example, a potting encapsulation may be used, with which the surface of the primary radiator is recessed. The semiconductor component 10 can thus be designed, for example, as a correspondingly modified DIP (dual in-line package) or QFN (quad flat no-leads package) component. For a simplified mounting of the waveguide 11a, b on the Hall-effect conductor component 10, it is also conceivable to design the encapsulation in a self-centering manner for the waveguide 11a, b with respect to the primary radiator.

In the exemplary embodiment of the fill-level measuring device 1 according to the invention shown in FIG. 2, the waveguide 11a, b is fixed with respect to the semiconductor component 10 by means of a shielding 16. The shielding 16 is designed as a cap and is mounted on the printed circuit board 15 in such a way that it covers the semiconductor component 10 on the printed circuit board 15. In order to achieve the shielding effect, it is necessary to design at least the surface of the shielding 16 in an electrically conductive manner. Accordingly, the shielding 16 can be made entirely of a metal, for example. However, a coated plastic substrate with which the metallic coating is applied, for example, by PVD ("physical vapor deposition") could also be used as the cap. Given that the shielding 16 comprises a corresponding grommet in the axis of the waveguide 11a, b, it also takes care of fixing the waveguide 11a, b with respect to the semiconductor component 10 in addition to providing the shielding.

A potting encapsulation 13 is arranged radially around the waveguide 11a, b outside of the shielding 16. According to the invention, the waveguide 11a, b is hereby encapsulated in such a way that a defined cavity 14 is formed between the waveguide 11a, b and the potting encapsulation 13. The potting encapsulation 13 is structured in such a way that it has a distance r proceeding radially from the waveguide 11a, b of at least twice the wavelength of the radar signals $S_{HF}$, $E_{HF}$. The distance r decisively increases the transmission of the radar signals $S_{HF}$, $E_{HF}$ in the waveguide 11a, b. The potting encapsulation 13 can be structured, for example, by means of a corresponding encapsulation cup around the waveguide 11a, b, which defines the structure of the potting encapsulation 13 during the potting. In the design variant shown, the potting encapsulation 13 in turn surrounds the surface of the printed circuit board 15 facing away from the semiconductor component 10. Thus, any electronic components on the back side of the printed circuit board 15 are also encapsulated. Optionally, as shown in FIG. 2, the outer surface 21 of the potting encapsulation 13 can be designed to be electromagnetically shielding, in order to achieve improved electromagnetic compatibility. Here again, it is conceivable to metallically coat the outer surface of the potting encapsulation 13, for example by PVD ("physical vapor deposition"). Alternatively, a separate, metallic potting cup can also be used for this purpose.

For emitting the radar signals $S_{HF}$ or for receiving reflected radar signals $E_{HF}$, the waveguide 11a, b opens out in a horn antenna 12.

The horn antenna 12 is located on the outside of the housing 17 of the fill-level measuring device 1, in which the printed circuit board 15 with the semiconductor component 10, the waveguide 11a, b and the shielding 16 are accommodated. In order to fix the waveguide 11a, b toward the horn antenna 12, the housing 17 comprises a corresponding grommet 18 for the waveguide 11a, b. As indicated in FIG. 2, this grommet 18 can also be designed such that the waveguide 11a, b is automatically centered during assembly.

In order to isolate the interior of the housing 17 from the interior of the container 2 in a hermetical and pressure-resistant manner, a window 19 is inserted between the waveguide 11a, b and horn antenna 12 at the level of the grommet 18 and is transparent for the radar signals $S_{HF}$, $E_{HF}$. Accordingly, it can be manufactured from a glass or a ceramic and fixed, for example, by adhesive bonding, welding or some other melting joining method. Preferably, the window 19 is made of electrically non-conductive material having a dielectric value of greater than 1. From the thickness, the window 19 is ideally designed such that it withstands an absolute pressure of at least 100 bar.

In order to prevent accretion in the horn antenna 12 and associated reduction in performance, a filling 20 is introduced in the entire interior of the horn antenna 12. The filling 20 is made of an electrically insulating material. Due to the action of the filling 20 as a dielectric, the design of the horn antenna 12 must be correspondingly adapted to the dielectric.

It is advantageous for the guidance of the radar signals $S_{HF}$, $E_{HF}$ according to the invention between the semiconductor component 10 and the horn antenna 13 by means of the waveguide 11a, b that the distance between the printed circuit board 15 and the horn antenna 12 can be dimensioned as required. In the case of measuring applications with which high temperatures above 100° C. are prevalent in the interior of the container, the waveguide can, for example, be dimensioned with a length of up to 8 cm or more, so that the electronic components on the printed circuit board are correspondingly thermally decoupled from the climate in the container 3.

As shown in FIG. 2 the waveguide 11a, b can be constructed in two parts for the purpose of simplified modular production of various variants of the fill-level measuring device 1 according to the invention. In the design variant of the fill-level measuring device 1 shown in FIG. 2, the waveguide 11a, b therefore divides at the level of the shielding 16 into a first segment 11a facing the semiconductor 10 and a second segment 11b that faces the horn antenna 12. For unimpeded transmission of the radar signals $S_{HF}$, $E_{HF}$ along the resulting contact point between the segments 11a, 11b, it is advantageous if the segments 11a, 11b are connected to one another at least by a static contact pressure. The bonding of this contact point with an adhesive transparent for the radar signals $S_{HF}$, $E_{HF}$ is also possible.

In contrast to the illustration in FIG. 2, the waveguide 11a, b can alternatively be designed with a curved course, preferably with a rectangular cross section. For this purpose, it is advantageous in the context of manufacture if the waveguide 11a, b is made of a flexible material. In this connection, it is conceivable to bend the waveguide 11a, b along its course by 90° and to arrange the horn antenna 12 correspondingly tilted on the housing 12, in order to be able to design the entire structure of the fill-level measuring device 1 as compactly as possible depending on the installation situation on the container 2.

The invention claimed is:

1. A radar-based fill-level measuring device comprising:
    a semiconductor component configured to:
        to generate or receive high-frequency electrical signals, and
        to determine a fill level value on the basis of at least the received high-frequency signals;
    a dielectric waveguide that is contacted with the semiconductor component in order to couple the high-frequency signals as radar signals into an antenna or to couple received radar signals from the antenna as electrical signals into the semiconductor component; and
    a potting encapsulation that radially encapsulates at least the waveguide in such a way that a defined cavity is formed between the waveguide and the potting encapsulation;
    wherein the encapsulation is designed so the cavity between the waveguide and the potting encapsulation has a distance of at least twice the wavelength of the radar signals;
    wherein the semiconductor component is designed to generate the high-frequency electrical signals at a frequency of at least 100 GHz or to process corresponding high-frequency electrical signals after reception.

2. The fill-level measuring device of claim 1, wherein the waveguide is dimensioned with a length of at least 3 cm.

3. The fill-level measuring device of claim 1, comprising:
    a printed circuit board on which the semiconductor component is arranged,
    an electromagnetic shielding of the semiconductor component mounted on the printed circuit board inside the potting encapsulation, wherein the shielding fixes the waveguide toward the semiconductor component so the radar signals can be coupled into the waveguide or into the semiconductor component.

4. A fill-level measuring device of claim 3, wherein the waveguide is designed in two parts so the waveguide is subdivided into a first segment and a second segment in the region of the shielding.

5. A fill-level measuring device of claim 1, comprising:
    a housing enclosing at least the semiconductor component, the waveguide and the potting encapsulation, wherein the antenna is fixed to outside of the housing, and a grommet in the housing that fixes the waveguide in such a way towards the antenna that the radar signals can be coupled into the antenna or into the waveguide.

6. A fill-level measuring device of claim 1, wherein the waveguide is made of an insulating material having a dielectric value of greater than 1.

7. A fill-level measuring device of claim 3, wherein the potting encapsulation encapsulates the surface of the printed circuit board facing away from the semiconductor component.

8. A fill-level measuring device of claim 1, wherein an outer surface of the potting encapsulation is electromagnetically shielding.

* * * * *